United States Patent
Sternlieb

[11] Patent Number: 5,843,557
[45] Date of Patent: Dec. 1, 1998

[54] CONFORMABLE STRUCTURAL REINFORCEMENT SUBSTRATE AND METHOD OF MAKING SAME

[76] Inventor: Herschel Sternlieb, 21 McKeen St., Brunswick, Me. 04011

[21] Appl. No.: 195,160

[22] Filed: Feb. 14, 1994

[51] Int. Cl.⁶ .................................................. B32B 9/00
[52] U.S. Cl. ...................... 428/105; 428/110; 428/233; 428/234; 428/247; 428/255; 428/280; 428/284; 428/287; 428/293; 428/299
[58] Field of Search ..................................... 428/110, 233, 428/247, 280, 282, 284, 285, 287, 299, 246, 251, 257, 273, 297, 234, 255, 293

[56] References Cited

U.S. PATENT DOCUMENTS 3,493,452  2/1970  Cole ........................................ 428/110
5,047,276  9/1991  Chomart et al. ........................ 428/110

*Primary Examiner*—Patrick J. Ryan
*Assistant Examiner*—Abraham Bahta

[57] ABSTRACT

A structural reinforcement substrate with a conformable batt of relatively long staple oriented structural fibers disposed between at least two layers of randomly oriented short staple fibers and method of production thereof provides a strong, cohesive product which can readily be handled upon subsequent molding yet is readily conformable. Preferably, long oriented structural fibers are used in a plurality of planar elements. The jet orifices are widely spaced to minimize hydro-entanglement such that the original planar relationships of the fibers are substantially maintained.

12 Claims, 1 Drawing Sheet

CONFORMABLE STRUCTURAL REINFORCEMENT SUBSTRATE AND METHOD OF MAKING SAME

BACKGROUND

The present invention relates to structural reinforcement substrates for use in resin impregnation molding. The structural reinforcement substrate herein disclosed is composed of a multilayer complex of fibers having a layer of glass fibers sandwiched between two layers of carded webs or like fibers serving as binding agents. The applicability of the present invention extends to most structural applications.

A considerable deficiency in structural reinforcement substrates for resin impregnation molding is that strength is obtained at the expense of conformability and vice versa. Strength is related to the type, length and orientation of the fibers while conformability is related to the slippage of the fibers in the substrate. Generally, the strongest fabrics are made utilizing oriented continuous filament fibers in either woven or stitchbonded configurations. See, e.g., U.S. Ser. No. 3,761,345 to Smith. Fabrics with maximum conformability, on the other hand, are generally those having relatively short staple fibers or continuous filament yarns which are randomly oriented.

There have been many efforts to create oriented webs, as for example, in the following patents: U.S. Ser. No. 2,132,457 to Blackshaw; U.S. Ser. No. 2,884,010 to Fischer; U.S. Ser. No. 3,066,358 to Schiess; U.S. Ser. No. 3,493,452 to Cole; U.S. Ser. No. 3,894,315 to Fukuta; and U.S. Ser. No. 4,615,717 to Neubauer. These webs are adhered by conventional means of mechanical needling or chemical bonding and can be adhered by hydraulic entangling.

The art of laminating fibrous structures by means of hydraulic entangling is well known and was first disclosed by Bunting in Australian patent No. 287,821. In his Examples X and XII, he taught that carded webs could-be attached to both sides of a third fibrous structure to yield a cohesive fabric. This process treats a layered composite placed on a 30 mesh screen by projecting water at 1500 psi through 0.0028 inch diameter orifices on 0.025 inch centers. In Example I Bunting also discloses a method of hydro-stitching a web using widely spaced jets (0.75 inch) to form a quilted structure from a single web of staple polyester. The web is hydrostitched in one direction and then the substrate is turned at 90 degrees and hydrostitched across the first stitching, thus forming a quilted structure. The prior art process of quilting would be impossible to reproduce by a continuous, high speed process.

Chomarat in U.S. Pat. No. 5,047,276 teaches hydro-laminating a web of non-brittle, flexible synthetic fibers to a web of glass filaments. To achieve further strength, a reinforcing structure is layered between the two webs to be laminated. Chomarat discloses, for example, the use of staple length glass having a diameter of 14 microns and 2 inch length as a reinforcing structure. FIG. 2 depicts 5 manifolds, indicating that the complex is subjected to an overall hydraulic entanglement treatment. During this treatment the fibers of the synthetic layer are reoriented to pass through the multilayer complex. Frankenberg, in U.S. Ser. No. 4,612,237, describes hydraulically laminating a polyester and glass web to a supporting scrim. Relatively short fibers of 0.6 cm to 7.6 cm (3 in.) are used. A 40 gauge manifold with 0.005 inch orifice holes is used on a 40 mesh backing with multiple passes up to 2,000 psi. Again, a uniformly entangled structure is produced.

Hydraulic entangling, however, has the negative effect of altering the planar relationships of the oriented webs by entangling fibers from one plane into and with fibers from the other planar webs, thus weakening the final composite structure. High pressure hydraulic treatment has the additional drawback of removing finish from the fibers that assists in the process of resin bonding.

As mentioned above, U.S. Ser. No. 3,761,345 to Smith discloses a multilayer oriented yarn structure utilizing stitchbonding. The production of multi-axial woven fabrics is known for both its complexity and its slowness of production.

The structural reinforcement substrate of the present invention overcomes the drawbacks of the prior art in providing a strong, cohesive structural reinforcement substrate which can be readily handled upon subsequent molding yet is readily conformable. The present invention involves a conformable batt of staple oriented structural fibers arranged in one or more planar elements and disposed between at least two layers of randomly oriented, short staple fibers that are readily hydro-entangled. In a preferred embodiment, the conformable batt is arranged with fibers oriented in a plurality of planar elements where each planar element is oriented in a different direction. The structural fibers are preferably long and substantially composed of glass. The sandwich configuration of fibers is subjected to a hydro-entangling process in which the orifices of the manifold are widely spaced. The amount of entangling brought about is minimal such that the original planar relationships of the fibers are substantially maintained.

It is an objective of the present invention to provide a structural reinforcement substrate of maximum strength.

It is an objective of the present invention to provide a structural reinforcement substrate with excellent conformability.

It is a further objective of the present invention to provide a structural reinforcement substrate which is cohesive.

It is a further objective of the present invention to provide a structural reinforcement substrate which can be readily handled upon subsequent molding.

It is a further aim of the present invention to provide a conformable structural reinforcement substrate by a continuous, high speed process.

It is an added objective of the present invention to provide a structural reinforcement substrate with oriented structural fibers of weights ranging up to 200 ounces per square yard.

It is a further objective of the present invention to provide a finished structural reinforcement substrate without the necessity of reapplying finish to the molded product.

It is yet another objective of the present invention to provide a process of producing a structural reinforcement substrate of maximum strength.

It is another objective of the present invention to provide a process of producing a structural reinforcement substrate with excellent conformability.

It is a further objective of the present invention to provide a process of producing a structural reinforcement substrate which is cohesive.

It is a further objective of the present invention to provide a process of producing a structural reinforcement substrate which can be readily handled upon subsequent molding.

It is a further objective of the present invention to provide a process of producing a finished structural reinforcement substrate without the necessity of reapplying finish to the molded product.

SUMMARY OF INVENTION

The present invention involves a conformable batt of staple oriented structural fibers arranged in one or more planar elements and placed between two layers of randomly oriented short staple fibers that are readily hydro-entangled. In a preferred embodiment, the conformable batt is arranged in a plurality of planar elements where each planar element is oriented in a different direction. The structural fibers are preferably long and substantially composed of glass. The sandwich configuration of fibers is subjected to a hydro-entangling process in which the orifices of the manifold are widely spaced. The amount of entangling is minimal such that the original planar relationships of the fibers are substantially maintained. A strong, cohesive structural reinforcement substrate is provided which can be readily handled upon subsequent molding and yet is readily conformable.

DETAILED DESCRIPTION OF INVENTION

The structural reinforcement substrate of the present invention has a central layer of oriented structural fibers sandwiched between at least two layers of randomly oriented short staple fibers. The oriented structural fibers forming the conformable batt are arranged as discontinuous strands which are densely arranged. Materials such as glass fibers, kevlar, carbon fibers or the like may comprise the oriented structural fibers of the present invention. Preferably, the oriented structural fibers are composed of glass with a minimum of broken fibers. Glass fibers up to 200 ounces per square yard have been utilized.

To achieve optimal strength for specific applications, the length of the oriented structural fibers must be appropriate. Fiber lengths used range up to about 8 inches. In the preferred use of the present invention, i.e., for larger molded applications, long fibers between about 3 and 8 inches are used. It has been discovered, in accordance with the most preferred embodiment, that the use of glass fibers 8 inches in length with an 11–14 micron diameter yields an optimal strength product for most structural applications. The mold should be in excess of 8 inches in its shortest dimension to be applicable. It has been found that oriented structural fibers longer than 8 inches generally do not yield improved structural properties, even when utilizing continuous filament fibers. Shorter fibers naturally can be used, for smaller molded applications.

Figure 1:
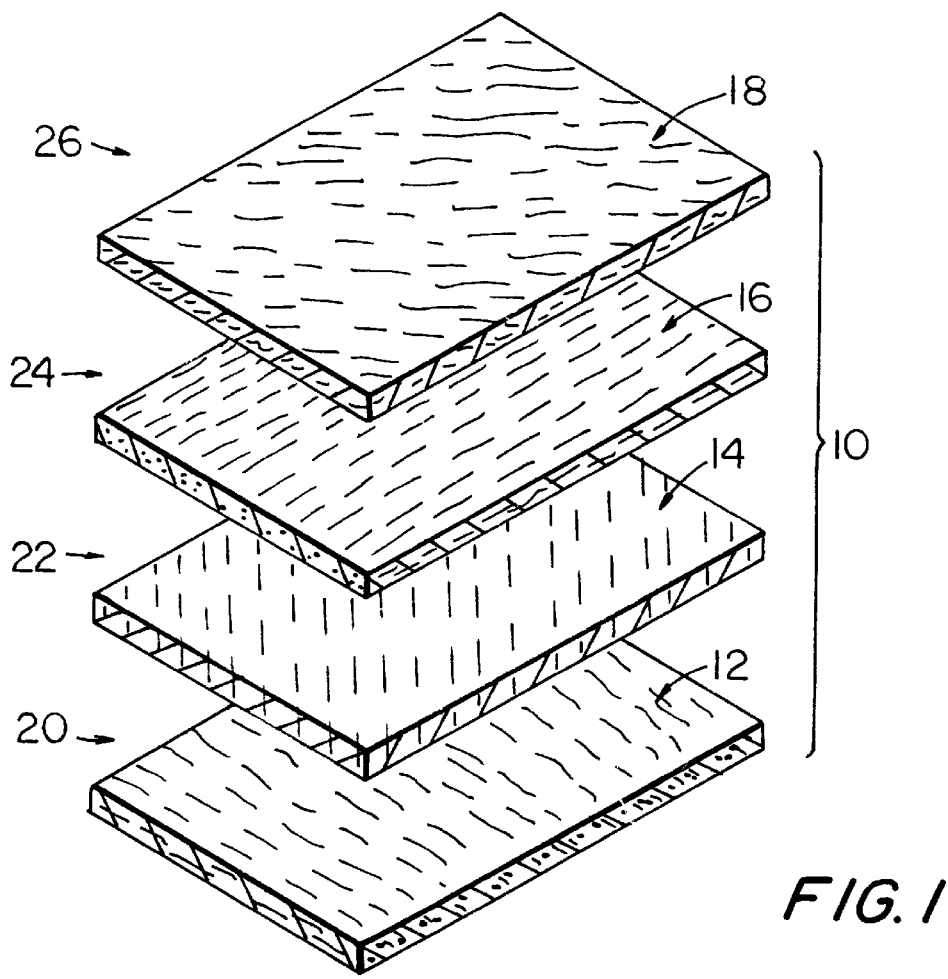
FIG. 1 depicts an exploded view of a preferred embodiment conformable batt of long staple oriented structural fibers.

The conformable batt of oriented structural fibers is arranged in one or more planar elements. The oriented structural fibers within any particular planar element are substantially parallel with respect to each other. In a preferred embodiment, the conformable batt of structural fibers is arranged in a plurality of planar elements where each planar element is oriented in a different direction. The most preferred embodiment is depicted in FIG. 1, showing an exploded view of a conformable batt of long staple oriented structural fibers 10. Randomly discontinuous long oriented structural fibers 12, 14, 16 and 18 are depicted. These structural fibers 12, 14, 16, and 18 are arranged in four separate planar elements of fibers, namely, planar elements 20, 22, 24 and 26, respectively, wherein each planar element is oriented in a different direction. In particular, planar element 20 is oriented at about 0 degrees, planar element 22 at about 45 degrees, planar element 24 at about 90 degrees and planar element 26 at about 135 degrees from the machine direction of the apparatus. To enhance the stability of the final product, the two outer planar elements, 20 and 26, are oriented in different directions from the machine direction of the apparatus.

To achieve the structural reinforcement substrate of the present invention, a conformable batt of long staple oriented structural fibers are laid onto at least one layer of randomly oriented short staple fibers such that the oriented structural fibers are substantially perpendicular to the thickness direction of the at least one layer of short staple fibers. The short staple fibers are randomly oriented such that they are readily hydro-entangled. Another at least one layer of short staple fibers is placed on the exposed side of the conformable batt.

These layered mats may be carried on a 100 mesh screen underneath a manifold with 0.005 inch diameter orifices in a continuous, high speed process. Line speeds of 4 feet per minute and 100 feet per minute have been utilized with acceptable results; it is expected that speeds in excess of 100 feet per minute would also be applicable. Room temperature water is generally sprayed from the manifolds. However, it will be appreciated that any compatible non-compressible fluid may be used. The water pressure during hydro-entanglement ranges from about 250 psi to 3000 psi and depends to a large extent on the type of oriented structural fibers chosen. Generally for glass fibers, a pressure of 500 psi to 1000 psi is used. In order not to break the glass fibers, the pressure should not exceed 1000 psi. For carbon fibers, the pressure may be as low as 250 psi while for kevlar fibers, the pressure may be as high as 3000 psi. After hydro-entanglement treatment on one side the fabric is turned over and subjected to the same treatment on the other side.

The jet orifices are widely spaced to minimize entangling the glass fibers or forcing them out of their planar directions yet provide sufficient adhesion of the layers. A jet density of 2 per inch permits achievement of the desired results. It has also been discovered, in accordance with the preferred embodiment, that by utilizing 2 or 3 jets on 0.017 inch centers and repeating this jet configuration every 0.5 inch, better adhesion is obtained. It is important that the spacing between the jets be sufficient to hold the structure together but not so large as to cause irregularities due to insufficient cohesiveness during subsequent molding operations. It is critical that the entanglement of the fibers of the carded webs be sufficient to allow the finished structure to be easily handled in subsequent operations and provide sufficient conformability. Fiber entanglement is shown in FIG. 2 particularly with respect to the preferred embodiment.

Figure 2:
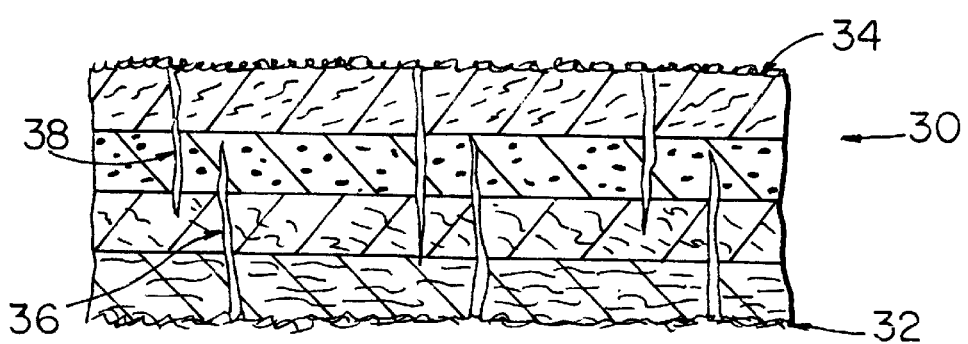
FIG. 2 depicts a side view of the preferred embodiment structural reinforcement substrate of the present invention.

FIG. 2 depicts a side view of the preferred embodiment structural reinforcement substrate 30 of the present invention. To achieve this structure, the conformable batt of long staple oriented structural fibers 10 with four separate planar elements of fibers each oriented in different manner as depicted in FIG. 1 are laid onto carded web layer 32 such that the oriented structural fibers are substantially perpendicular to the thickness direction of carded web layer 32. Carded web layer 32 is a randomly oriented, loose web of short staple fibers that are readily hydro-entangled. It may consist, for example, of one ounce per square yard 1.5 inch×1.5 denier polyester. It will be appreciated that the carded web layer serves as a binding agent for the structural reinforcement substrate and that like materials may be utilized, e.g., regular spun lace products, wet lay nonwovens, chopped mats or lightly needled webs, or even yarn rovings set directly beneath the jet orifices. Carded web layer 34 or like binding agent is placed on the exposed side of oriented structural fiber layer 10 to form a sandwich configuration of fibers.

During hydro-entanglement, random fibers 36 and 38 from the loose web of carded web layers 32 and 34, respectively, become entangled within the oriented structural fiber layer 10. As shown, relatively few fibers penetrate the dense arrangement of oriented structural fibers. The amount of entanglement resulting is minimal such that the original planar relationships of the fibers are substantially maintained.

It has also been discovered that by limiting the total amount of force applied to the glass fibers by the hydro-entanglement process, e.g., limiting the water speed or pressure or number of manifolds, the amount of finish removed is minimal and thus there is no significant lessening of the properties of the finished molded product. The further step of reapplying finish to the glass structure may therefore not be required. In a preferred embodiment, few manifolds are used.

EXAMPLE I

One ounce per square yard carded web of 1.5 inch×1.5 denier polyester fiber was used with 8 inch, 11–14 micron oriented glass fibers, 27 ounces per square yard, arranged in 4 different directions and in 4 separate planes. A single manifold was used with 3 jets having 0.005 inch diameter orifices on 0.017 inch centers spaced every 0.5 inch. Water pressure was 500 psi with a line speed of 4 feet per minute. After treatment on one side, the fabric was turned over and treated in exactly the same manner on the other side in the same machine direction. The resulting fabric was cohesive and totally conformable. Very minimal fiber breakage was observed.

EXAMPLE II

The same parameters as described in Example I were used except the pressure was 1,000 psi at a line speed of 100 feet per minute. Similar results were achieved as in Example I.

What is claimed is:

1. A structural reinforcement substrate comprising a conformable batt of oriented structural fibers arranged in one or more planar elements and at least two layers of randomly oriented short staple fibers where said conformable batt is disposed between said at least two layers of short staple fibers and a portion of said short staple fibers are entangled within said oriented structural fibers such that the original planar relationships of said structural fibers are substantially maintained.

2. A structural reinforcement substrate as claimed in claim 1 in which the oriented structural fibers are arranged in a plurality of planar elements such that each planar element is oriented in a different direction.

3. A structural reinforcement substrate as claimed in claim 2 in which the outer planar elements of the oriented structural fibers are oriented in different directions from the machine direction of the apparatus.

4. A structural reinforcement substrate according to claim 2 wherein the oriented structural fibers are oriented in four planar elements.

5. A structural reinforcement substrate according to claim 4 wherein the four planar elements are oriented at 0 degrees, 45 degrees, 90 degrees and 135 degrees from the machine direction of the apparatus.

6. A structural reinforcement substrate according to claim 1 wherein the oriented structural fibers are glass, kevlar or carbon fibers.

7. A structural reinforcement substrate according to claim 1 wherein the oriented structural fibers are up to 8 inches in length.

8. A structural reinforcement substrate according to claim 7 wherein the oriented structural fibers are between about 3 to 8 inches in length.

9. A structural reinforcement substrate according to claim 8 wherein the oriented structural fibers are about 8 inches in length and about 11–14 micron diameter.

10. A structural reinforcement substrate according to claim 1 wherein the oriented structural fibers are up to 200 ounces per square yard.

11. A structural reinforcement substrate according to claim 1 which the randomly oriented short staple fibers are carded web, spun lace, wet lay nonwovens, chopped mats, lightly needled webs or yarn rovings.

12. A structural reinforcement substrate for resin impregnation molding comprising a conformable batt of oriented structural fibers between about 3 to about 8 inches in length oriented in a plurality of planar elements and at least two layers of randomly oriented short staple fibers, where said conformable batt is disposed between said at least two layers of short staple fibers and a portion of said short staple fibers are entangled within said oriented structural fibers such that the original planar relationships of said structural fibers are substantially maintained.

\* \* \* \* \*